United States Patent [19]
McMarlin

[11] 3,864,883
[45] Feb. 11, 1975

[54] METHOD AND APPARATUS FOR CLOSING A PASSAGEWAY

[75] Inventor: Robert M. McMarlin, Murrysville, Pa.

[73] Assignee: Pittsburgh Corning Corporation, Pittsburgh, Pa.

[22] Filed: Apr. 10, 1973

[21] Appl. No.: 349,767

[52] U.S. Cl................... 52/221, 52/232, 52/741, 174/48
[51] Int. Cl. .................... H02g 3/08, E04f 17/08
[58] Field of Search ............ 52/220, 221, 232, 741; 174/47, 48; 220/3, 4; 138/92

[56] References Cited
UNITED STATES PATENTS

| | | | |
|---|---|---|---|
| 2,125,366 | 8/1938 | Young et al. | 52/221 |
| 2,142,165 | 1/1939 | Young | 52/232 |
| 2,279,791 | 4/1942 | Lamb | 169/2 R |
| 3,255,559 | 6/1966 | Gaeth et al. | 52/232 |
| 3,354,024 | 11/1967 | D'Eustachio et al. | 161/168 |
| 3,566,564 | 3/1971 | Gaeth et al. | 52/232 |
| 3,630,764 | 12/1971 | Shannon | 106/15 |
| 3,701,837 | 10/1972 | Fork | 52/221 |

*Primary Examiner*—Alfred C. Perham
*Attorney, Agent, or Firm*—Stanley J. Price, Jr.

[57] ABSTRACT

A shaped body of intumescent material is positioned in an underfloor access housing in abutting relation with the base of the housing. The body of intumescent material is shaped to extend around the cable inlet opening in the housing base portion, so that a passageway remains for the cables extending from the underlying cable cells to the underfloor access housing outlet opening. When the underlying cable cells and the underside of the access housing are subjected to an elevated temperature, the body of intumescent material foams and expands to substantially fill the access housing and close the opening or passageway between the cable inlet opening and the cable outlet opening to insulate one portion of the access housing from the other and maintain a substantial temperature differential for an extended period of time between the base of the access housing and the closure cap secured to the upper portion of the access housing. In another embodiment a shaped body or bodies of intumescent material are positioned in a duct or cable tray that has cables, tubing and the like therein. When the outer surface of the duct is subjected to elevated temperatures due to a fire the intumescent material foams and expands and insulates the cables and tubing from the outer surface of the duct and thus delays and possibly prevents the thermal destruction of the cables and tubing positioned in the duct. The preferred body of intumescent material contains between 70% – 100% by weight of an intumescing binder, such as sodium silicate or potassium silicate, and between 0 – 30% by weight filler for increasing the viscosity of the foam. Suitable fillers are clay, cellulatable glass and the like. Organic intumescent mixtures may also be employed in the shaped body of intumescent material.

6 Claims, 7 Drawing Figures

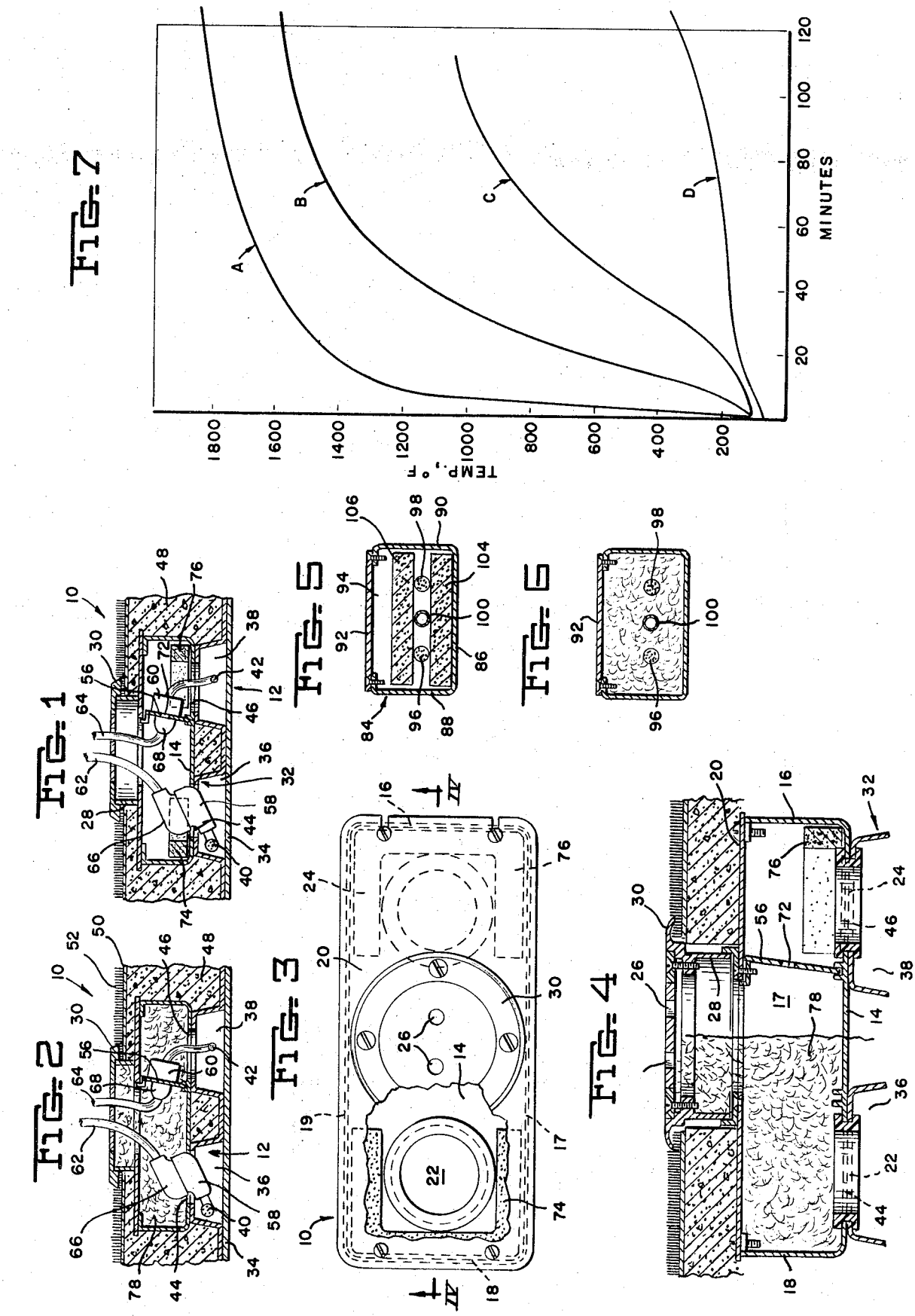

METHOD AND APPARATUS FOR CLOSING A PASSAGEWAY

BACKGROUND OF THE INVENTION

1. Field of the Invention

This invention relates to a method and apparatus for closing a passageway and more particularly to a method and apparatus for closing a passageway in a member and insulating one portion of the member from a second portion of the same member.

2. Description of the Prior Art

U.S. Pat. No. 2,279,791 discloses a fire screen having the individual wires coated with an intumescent material. The spacing of the coated wires is such that openings of substantial size are left in the screen for air flow therethrough. The screen is positioned in an air conditioning duct in conjunction with conventional filters. The purpose of the coated screen is to close the duct when the air flowing through the duct increases in temperature due to a fire at a location remote from the screen. The coating on the screen wires, when heated by the air flowing through the screen, foams and expands to close the openings in the screen and thus form a barrier to block the flow of air through the duct. The screen merely forms a temporary barrier to the flow of air through the duct and because of the metallic grid does not insulate one portion of the duct from a second portion of the same duct.

There is disclosed in co-pending United States Patent Application, Ser. No. 278,245, filed Aug. 7, 1972, an intumescent composition including sodium silicate, cellulatable glass and a bloatable clay. The intumescent composition is applied to a substrate and when subjected to elevated temperatures foams and expands to insulate the substrate from elevated temperatures. The intumescent composition disclosed in the above application begins foaming and expanding at a relatively low temperature and continues to foam and expand over a wide temperature range.

SUMMARY OF THE INVENTION

In accordance with the present invention, apparatus is provided for closing an opening in a passageway and includes a body of intumescent material having a cross-sectional area less than the cross-sectional area of the passageway so that an opening remains in the passageway around the body of intumescent material. When the body of intumescent material is subjected to an elevated temperature the body foams and expands to increase the cross-sectional area of the intumescent material to substantially fill the cross-sectional area of the passageway and close the opening in the passageway.

Further, in accordance with the present invention, there is provided a method for insulating a member having a base portion and a top portion with a passageway therebetween that includes positioning a body of intumescent material in the passageway. The body of intumescent material is so positioned in the passageway that an opening remains in the passageway around the body of intumescent material. When the body of intumescent material is subjected to an elevated temperature it foams and expands to substantially fill the cross-section of the passageway, close the opening in the passageway and insulate the upper portion of the metallic member from the base portion so that a substantial temperature differential is maintained therebetween.

Accordingly, the principal object of this invention is to provide a method and apparatus for closing a passageway and insulating a portion of the member having the passageway therein.

Another object of this invention is to provide a method and apparatus for selectively insulating a passageway without modifying the structural features of the member having the passageway therein.

These and other objects and advantages of this invention will be more completely disclosed and described in the following specification, the accompanying drawings and the appended claims.

BRIEF DESCRIPTION OF THE DRAWINGS

FIG. 1 is a diagrammatic view in section of a concrete floor having a corrugated metal deck with cable cells therein and an access housing providing access to the cable cells from the floor above.

FIG. 2 is a view similar to FIG. 1, illustrating the manner in which the shaped bodies of intumescent material expand to fill the access housing and close the passageways between the inlet openings in the base of the housing and the outlet openings to the floor above.

FIG. 3 is a top plan view of the access housing with the shaped bodies of intumescent material positioned therein.

FIG. 4 is a view in section taken along the line IV—IV of FIG. 3, illustrating on the right side a shaped body of intumescent material positioned in the access housing and on the left side a body of intumescent material in a foamed or expanded state.

FIG. 5 is a view in section of a cable tray or duct in which cables, tubing and the like are supported on the shaped body of intumescent material positioned therein with a shaped body of intumescent material positioned over the cables, tubing and the like.

FIG. 6 is a view similar to FIG. 5, illustrating the intumescent material insulating the cables and tubing from the walls of the duct.

FIG. 7 is a graphic representation of the insulating properties of the intumescent material in an access housing similar to that illustrated in FIGS. 1 – 4.

DESCRIPTION OF THE PREFERRED EMBODIMENTS

Referring to FIGS. 1 – 4, there is illustrated an underfloor access housing generally designated by the numeral 10 secured to an electrical raceway section 12. The access housing has a generally rectangular configuration and has a bottom wall or base portion 14, upstanding end walls 16 and 18, side walls 17 and 19, and a top wall 20. The bottom wall 14 is provided with a pair of spaced inlet openings 22 and 24 and the top wall 20 is provided with a central dual outlet opening 26. A metal mounting ring 28 is secured in the outlet opening 26 and has a flanged annular lip 30.

The access housing 10 is positioned on the upper surface of the raceway section 12 that includes a corrugated metal upper sheet 32 and a lower metal sheet 34. The recessed portions 36 and 38 in the corrugated metal sheet 32 form cableways for cables 40 and 42. The corrugated metal sheet has suitable openings 44 and 46 which are in underlying relation with openings 22 and 24 of the access housing 10 so that the respective cables 40 and 42 may be threaded through the aligned openings from the cableways into the access housing 10. As illustrated in FIGS. 1 and 2, the access housing 10 and the raceway section 12 are surrounded by concrete 48 to form a floor 50 of a building with a rug or floor covering 52 positioned on the upper surface of the concrete 48. The lower metallic plate 34 forms the ceiling of the floor below.

Within the access housing 10 there is positioned a support plate 56 with a plug receptacle 60 secured thereto. A conduit 42 is connected to the plug receptacle 60 and a connecting conduit 64 has a plug 68 associated therewith that may be plugged into the receptacle 60. The plate 56 has an opening 72 therein for portions of the receptacle 60. The plate 56 is preferably pivotally connected to the bottom wall 14, as is illustrated in FIG. 4, to permit access to the rear portion of the plate for connecting the cables to the receptacles secured on the rear surface of the plate.

The cable 40 is preferably multi-strand telephone cable terminating in a female connector 58. A male connector 66 may be connected to the female connector 58 thereby completing electrical connections to a plurality of telephones by means of a second cable 62. With the multi-strand telephone cable and the male and female connectors a plate similar to plate 56, previously described, is not employed.

When the plate 34, which forms the ceiling of the floor below, is subjected to elevated temperatures as, for example, when the ceiling is exposed to fire, the metal plate 34 and the corrugated metal upper sheet 32 rapidly increase in temperature. The concrete 48 forming the floor tends to insulate the floor above from the elevated temperatures. However, the connection between the metal upper sheet 32 and the access housing 10 provides a path for rapid heat transfer by radiation and convection from the floor below to the floor above because of the high thermal conductivity of the metallic raceway and access housing and the open passageways therebetween. Further, the mounting ring 28 and annular lip 30 extend through the concrete and expose the floor to these elevated temperatures. A passageway extends from the recessed portions or cableways 36 and 38 through respective openings 44 and 46 and openings 22 and 24 in access housing 10 to provide a path for unrestricted transfer of heat therethrough. Within the access housing 10 a passageway for unrestricted transfer of heat exists through the opening 72 and upwardly through the outlet opening 26.

As illustrated in FIGS. 1 and 3, a pair of U-shaped intumescent bodies 74 and 76 are positioned in the access housing 10 in abutting relation with the base 14. The bodies of intumescent material 74 and 76 have a generally U-shaped configuration and extend around the cables and receptacles and do not interfere with the respective cables and receptacles.

When the shaped bodies of intumescent material 74 and 76 are subjected to an elevated temperature, preferably above 250°F., as, for example, when a fire occurs at the floor below and raises the temperature of the metal sheet 32, the intumescent material foams and expands to fill the access housing 10, as is illustrated in FIG. 2 and designated by the numeral 78. The foamed and expanded intumescent material 78 closes the passageway formed by the overlying openings 44, 22 and 46, 24 between the cable raceways 36 and 38 and the inner portion of the access housing 10. Further, the foamed and expanded intumescent material 78 closes the outlet opening 26 in the housing 10 to effectively insulate the upper portion of the access housing 10 from the lower portion. The foamed and expanded intumescent material 78 insulates the top wall 20, mounting ring 28 and the annular lip 30 from the base 14 to thus limit heat transfer from the lower metallic member 34 through the cable raceways 36 and 38 and access housing 10 to the floor above.

It should be understood that the shaped bodies of intumescent material may have configurations other than the generally U-shaped configuration disclosed and may also be formed in layers of material having different intumescent properties, as later discussed. It is preferred that the body of intumescent material have a cross-sectional dimension that is less than the cross-sectional dimension of the duct or housing in which the body of intumescent material is positioned to thus provide an opening in the passageway in which the body of intumescent material is positioned. The dimension of the body of intumescent material should, however, have a sufficient vertical dimension so that when the body of intumescent material foams and expands it substantially fills the cross-section of the passageway to thus close the passageway. With the intumescent material hereafter defined the discussed vertical dimension increases between 3 and 7 times the vertical dimension of the unfoamed intumescent material.

FIG. 7 is a time — temperature graphical illustration of the insulating properties of the intumescent material and graphically illustrates the manner in which the upper lip portion 30 of the access housing 10 is maintained at a relatively low temperature when the base portion of the receptacle is subjected to an elevated temperature. Curve A indicates the temperature within the furnace on which a portion of a metallic deck and access housing similar to that illustrated in FIGS. 1 and 2 is positioned. Curve A substantially follows the Standard E 119 Time - Temperature Curve for control of Fire Tests. Curve B represents the temperature of the exterior surface of the bottom wall of the access housing and generally has the same configuration as the Furnace Temperature Curve. Curve C represents the temperature of the upper lip of the access housing without the U-shaped intumescent bodies positioned in the access housing and also generally has the same configuration as the Furnace Temperature Curve. Curve D represents the temperature of the upper lip of the access housing when the tumescent bodies are positioned in the access housing and the portion of the metallic deck is subjected to the same temperature. Curve D deviates substantially from the configuration of the Furnace Temperature Curve and remains below 400°F. for a period in excess of two hours. From the graphical representations it is apparent that the intumescent material foams, expands and insulates the upper portion of the access housing 10 from the access housing base portion and maintains the temperature of the exposed portion of the access housing below 400°F. for a period in excess of two hours.

In accordance with ASTM fire rating standards it is essential that the temperature of the metallic portions of the cable way system projecting through the concrete remain below approximately 400°F. When the temperature of any one projecting portion exceeds approximately 400°F. the ASTM test is terminated and the deck is given a fire rating for the period of time any one projecting portion remains below 400°F., depending upon ambient temperature conditions.

Referring to FIGS. 5 and 6, there is illustrated in section a metallic duct member generally designated by the numeral 84 that has a base portion 86, side walls 88 and 90 and a top cover 92. The duct 84 has a passageway 94 in which electrical control cables 96 and 98 and fluid conduits or tubing 100 are positioned. The control cables 96 and 98 and tubing 100 are positioned on the base portion 86 and are arranged to connect remotely controlled devices on remotely located chemical equipment to a central control station. Signals are transmitted by the cables and tubing from the central control station to various devices and actuate the apparatus to control the chemical equipment from a remote location. The same arrangement for remote control is frequently present in other types of industrial applications.

When a fire occurs in a portion of the chemical or industrial installation it is highly desirable that the remote control apparatus remain operative at least for a sufficient period of time to actuate the necessary emergency controls and minimize or reduce the damage caused by the fire. Frequently, the control wires and tubing in the duct are subjected to intense heat of the fire and become inoperative so that remote control is no longer possible. As illustrated in FIG. 5, a body of intumescent material 104 is positioned in the duct 84 and extends preferably along the length of the duct. The electrical control cables 96 and 98 and tubing 100 are positioned on the upper surface of the body of intumescent material 104. A second body of intumescent material 106 is positioned on top of the cables 96 and 98 and tubing 100 so that the cables and tubing are sandwiched therebetween. When the outer surface of the duct is subjected to elevated temperatures of a fire the bodies of intumescent material 104 and 106 foam and expand, as illustrated in FIG. 6, to substantially fill the duct with the foamed and expanded intumescent material and thus insulate the cables 96 and 98 and tubing 100 from both the convection and radiant heat so that the cables and tubing remain operative to provide remote control for the apparatus.

The bodies of intumescent material are preferably unitary cohesive masses of intumescent material that foam and expand to both close the passageway and provide insulation for either cables within the passageway or for portions of the passageway. The unitary cohesive body of intumescent material preferably has a dimension substantially equal to the width of the duct or housing. Particulate intumescent material having a size greater than 3 or 4 mesh Tyler standard screen may be employed in certain confined locations.

A preferred intumescent material comprises primarily inorganic materials, such as an intumescent binder, water and various inorganic fillers. Suitable intumescent binders include sodium silicate and potassium silicate. Suitable fillers are milled glass cullet, clay, silica sand, fly ash, shale, perlite, vermiculite, volcanic ash and inorganic fibers such as mineral wool, glass fibers or asbestos. Where desired another suitable filler is partially cellulated glass or constituents of cellulatable glass i.e., an admixture of pulverulent glass and a carbonaceous cellulating agent. The partially cellulated glass or constituents of cellulatable glass both increase the viscosity of the intumescent material at low foaming temperatures and further at higher temperatures expand and foam to contribute to the intumescent properties of the material. Suitable compositions of cellulatable glass are disclosed in U.S. Pat. Nos. 3,354,024; 3,441,369 and 3,630,764. Other materials for increasing the set of the mixture may also be used. A suitable composition contains between 70% and 100% by weight of intumescent binder and between 0 and 30% by weight of a filler.

The following examples are illustrative of suitable intumescent compositions for forming the bodies of intumescent material.

EXAMPLE I

An admixture was prepared from 90% by weight dry sodium silicate, 5% by weight pulverulent clay and 5% by weight of a pulverulent cellulatable glass mixture. About 1 part by weight water was added to about 4 parts by weight of the admixture to form a viscous mass, which was thereafter shaped into a unitary cohesive body having a desired configuration. Thereafter, the unitary cohesive body was dried and permitted to set. The unitary cohesive body was thereafter subjected to elevated temperatures and started to foam and expand at 250°F. The vertical dimension of the unitary cohesive body increased between six to seven times during the foaming and remained stable to a temperature of approximately 950°F.

EXAMPLE II

An admixture was prepared from 80% by weight dry sodium silicate, 10% by weight pulverulent clay and 10% by weight of a pulverulent cellulatable glass mixture. Approximately 1 part by weight water was added to 4 parts by weight of the admixture to form a viscous mass that was shaped as a unitary cohesive body and permitted to set. The unitary cohesive body started to foam and expand at a temperature of between 275°F. and 350°F. and remained stable to a temperature of approximately 950°F. The vertical dimension of the unitary cohesive body increased to between four and six times its original size.

EXAMPLE III

An admixture was prepared from 70% by weight dry sodium silicate, 15% by weight pulverulent clay and 15% by weight of a pulverulent cellulatable glass mixture. About 1 part by weight water was added to about 4 parts by weight of the admixture to form a unitary cohesive body. The dried body started to foam and expand at between 300°F. to 350°F. and remained stable to a temperature of approximately 1,000°F. The vertical dimension of the body increased between three and five times during foaming.

For certain applications it may be desirable to position layers of the intumescent material having different foaming properties on top of each other to retard the foaming of the bodies of intumescent material until the lowermost body is subjected to higher temperatures. For example, a three layer body having the lowermost layer prepared in accordance with Example III, the intermediate layer prepared in accordance with Example II and the upper layer prepared in accordance with Example I would delay the initial foaming of the multilayered body of intumescent material until the base of the duct or housing was subjected to a higher temperature, i.e., between 300°F. – 350°F. as compared with 250°F. for the material prepared in accordance with Example I.

It will be apparent with shaped bodies of the intumescent material above described it is now possible to position bodies of the intumescent material in various existing passageways and provide a means to close the passageways and reduce the heat flow through the duct.

According to the provisions of the patent statutes, I have explained the principle, preferred construction, and mode of operation of my invention, and have illustrated and described what I now consider to represent its best embodiments. However, it should be understood that, within the scope of the appended claims, the invention may be practiced otherwise than as specifically illustrated and described.

I claim:

1. Apparatus for closing a passageway in an underfloor access housing comprising,
    an underfloor access housing having a base portion with an inlet opening therein and a top portion having an outlet opening therein and a passageway connecting said inlet opening and said outlet opening,
    a body of intumescent material positioned in said housing and having dimensions less than the internal dimensions of said underfloor access housing,
    said body of intumescent material operable to foam and expand when said underfloor access housing is subjected to elevated temperatures and substantially fill said access housing and close said passageway therein.

2. Apparatus for closing a passageway in an underfloor access housing as set forth in claim 1 in which,
    said body of intumescent material is positioned on the base portion of the underfloor access housing,
    said body of intumescent material operable to foam and expand when the base portion of the underfloor access housing is subjected to an elevated temperature and insulate the top portion of said underfloor access housing from the bottom portion of said underfloor access housing.

3. Apparatus for closing a passageway in an underfloor access housing as set forth in claim 1 in which,
    said body of intumescent material includes between 70% and 100% by weight alkali metal silicate and between 0 and 30% by weight inorganic filler.

4. Apparatus for closing a passageway in an underfloor access housing as set forth in claim 1 in which,
    said body of intumescent material includes about 90% by weight sodium silicate, about 5% by weight pulverulent cellulatable glass and about 5% by weight pulverulent clay.

5. A method for insulating an underfloor access housing having a base portion with an inlet opening therein and a top portion having an outlet opening therein and a passageway connecting said inlet opening and said outlet opening comprising,
    positioning a discrete shaped body of intumescent material in said passageway so that an opening remains in said passageway around said body of intumescent material,
    subjecting said body of intumescent material to an elevated temperature, and
    thereafter foaming and expanding said body of intumescent material to substantially fill the cross-section of said passageway and close said passageway.

6. A method for insulating an underfloor access housing as set forth in claim 5 which includes,
    positioning said body of intumescent material in abutting relation with the inner surface of said base portion.

* * * * *